US006605129B1

(12) United States Patent
Naito

(10) Patent No.: US 6,605,129 B1

(45) Date of Patent: Aug. 12, 2003

(54) POWDERED NIOBIUM, SINTERED BODY THEREOF, CAPACITOR USING THE SINTERED BODY AND PRODUCTION METHOD OF THE CAPACITOR

(75) Inventor: Kazumi Naito, Chiba (JP)

(73) Assignee: Showa Denko Kabushiki Kaisha, Toyko (JP)

(*) Notice: Subject to any disclaimer, the term of this patent is extended or adjusted under 35 U.S.C. 154(b) by 0 days.

(21) Appl. No.: 09/513,170

(22) Filed: Feb. 25, 2000

Related U.S. Application Data

(60) Provisional application No. 60/121,692, filed on Feb. 25, 1999, and provisional application No. 60/124,665, filed on Mar. 16, 1999.

(30) Foreign Application Priority Data

Mar. 1, 1999 (JP) .......................................... 11-052320

(51) Int. Cl.[7] .................................................. B22F 1/00

(52) U.S. Cl. ........................................... 75/252; 75/255

(58) Field of Search .......................... 75/255, 245, 252

(56) References Cited

U.S. PATENT DOCUMENTS 4,149,876 A * 4/1979 Rerat
4,954,169 A * 9/1990 Behrens ....................... 75/228
6,051,044 A * 4/2000 Fife .............................. 419/3
6,171,363 B1 * 1/2001 Shekhter et al. .............. 75/613

* cited by examiner

*Primary Examiner*—Ngoclan Mai
(74) *Attorney, Agent, or Firm*—Sughrue Mion, PLLC

(57) ABSTRACT

The present invention relates to a powdered niobium for a capacitor having a good specific leakage current value, a sintered body using the powdered niobium, a capacitor using the sintered body and production method of the capacitor. A powdered niobium for a capacitor, characterized in that the content of each of the elements such as iron, nickel, cobalt, silicon, sodium, potassium and magnesium is about 100 ppm by weight or less and/or the total content thereof is about 350 ppm by weight or less is used. A niobium sintered body or a capacitor is constructed using the powdered niobium. A niobium sintered body for a capacitor, comprises at least one of niobium monoxide crystal and a diniobium mononitride crystal.

4 Claims, No Drawings

POWDERED NIOBIUM, SINTERED BODY THEREOF, CAPACITOR USING THE SINTERED BODY AND PRODUCTION METHOD OF THE CAPACITOR

CROSS REFERENCE TO RELATED APPLICATIONS

This application is an application filed under 35 U.S.C.111(a) claiming benefit pursuant to 35 U.S.C. §119 (e)(1) of the filing dates of Provisional Application 60/121,692 filed Feb. 25, 1999, Provisional Application 60/124,665 filed Mar. 16, 1999 pursuant to 35 U.S.C. §111(b).

TECHNICAL FIELD

The present invention relates to a powdered niobium for a capacitor having a large capacity per unit weight and good specific leakage current property, a sintered body using the powdered niobium, a capacitor using the sintered body and production method of the capacitor.

DESCRIPTION OF RELATED ART

Capacitors used for electronic instruments such as portable telephone and personal computer are demanded to be compact and have a large capacity. Among these capacitors, a tantalum capacitor is preferably used because it has a large capacity for the size and exhibits good performance. In this tantalum capacitor, a sintered body of powdered tantalum is generally used for the anode moiety. In order to increase the capacity of the tantalum capacitor, it is necessary to increase the weight of sintered body or to use a sintered body increased in the surface area by pulverizing the powdered tantalum.

The former method of increasing the weight of sintered body is naturally accompanied by enlargement of the capacitor size and the requirement for downsizing cannot be satisfied. On the other hand, in the latter method of pulverizing the powdered tantalum to increase the surface area, the pore size of tantalum sintered body is reduced or closed pores are increased at the stage of sintering, therefore, a cathode agent can be difficultly impregnated in the after process. As a means for solving these problems, a capacitor using a sintered body of a powdered material having a dielectric constant larger than the tantalum is being studied. Examples of such a material having a larger dielectric constant include niobium and titanium.

However, conventional capacitors using a sintered body of such a material are disadvantageous in that the specific leakage current property is greatly dispersed and not satisfied by any means. Using a powdered tantalum makes a sintered body. When a sintered body is electrolytically oxidized and then combined with counter electrode to manufacture a capacitor, it is nothing to satisfy the basis which the specific leakage current as a practical value is 10 nA/μF·V and less. However, in capacitors using conventional powdered niobium and titanium, the specific leakage current values are greatly dispersed and there are many cases which exceed this value.

Furthermore, conventional capacitors using a sintered body of such a material are deficient in the high-temperature property and are not put into practical use. Because, when a sintered body is electrolytically oxidized and then combined with counter electrode to manufacture a capacitor, the high-temperature property usually falls within ±20% in the case of a sintered body using powdered tantalum, however, in some sintered bodies using conventional powdered niobium, the high-temperature property does not fall within ±20%.

Therefore, capacitors using a niobium sintered body and a titanium sintered body must be estimated to have low reliability also at room temperature and are duly judged deficient in the service life, thus cannot be used in practice.

DISCLOSURE OF THE INVENTION

As a result of extensive investigations, the present inventors have developed a powdered niobium for a niobium sintered body capable of providing a capacitor having a small dispersion in the specific leakage current value, and accomplished the present invention.

Furthermore, the present inventors have accomplished the present invention by findings which a capacitor having good high-temperature property is obtained when a crystal of a given niobium compound is comprised in a niobium sintered body.

Namely, the present invention relates to the following powdered niobium for capacitor, sintered body thereof, capacitor using the same and production method of the capacitor.

(1) A powdered niobium for a capacitor, containing elements such as iron, nickel, cobalt, silicon, sodium, potassium and magnesium, wherein an amount of each element is about 100 ppm by weight or less.

(2) A powdered niobium for a capacitor, containing elements such as iron, nickel, cobalt, silicon, sodium, potassium and magnesium, wherein the total amount of the elements is about 350 ppm by weight or less.

(3) A powdered niobium for a capacitor, containing elements such as iron, nickel, cobalt, silicon, sodium, potassium and magnesium, wherein an amount of each element is about 100 ppm by weight or less and the total amount of the elements is about 350 ppm by weight or less.

(4) The powdered niobium for a capacitor described in any one of the (1) to (3), which contains at least one of niobium nitride, niobium carbide and niobium boride.

(5) A sintered body for a capacitor using a powdered niobium described in any one of the (1) to (4).

(6) A niobium sintered body for a capacitor, comprising at least one of niobium monoxide crystal and a diniobium mononitride crystal.

(7) The niobium sintered body for a capacitor according to the (6), wherein the content of niobium monoxide crystal is from about 0.1 wt % to about 20 wt %.

(8) The niobium sintered body for a capacitor according to the (6), wherein the content of diniobium mononitride crystal is from about 0.1 wt % to about 20 wt %.

(9) A capacitor comprising one party electrode assigned to the niobium sintered body described in any one of the (5) to (8), other party electrode and a dielectric material interposed between two electrodes.

(10) The capacitor according to the (9), wherein the dielectric material is tantalum oxide, niobium oxide, polymer material, or ceramics compound.

(11) The capacitor according to the (10), wherein the dielectric material is niobium oxide formed by chemical forming on a niobium sintered body.

(12) A process for producing a capacitor, comprising preparing the second electrode opposing on the dielectric material, after forming the dielectric material on the niobium sintered body (first electrode) described in any one of the (5) to (8).

(13) The process for producing a capacitor according to the (12), wherein the dielectric material is tantalum oxide, niobium oxide, polymer material, or ceramics compound.

(14) The process for producing a capacitor according to the (13), wherein the dielectric material is niobium oxide formed on a niobium sintered body by chemical forming.

DETAILED DESCRIPTION OF THE INVENTION

The present inventors have found a capacitor having a small dispersion in the specific leakage current value provided that a powdered niobium for a capacitor contains elements such as iron, nickel, cobalt, silicon, sodium, potassium and magnesium each in an amount of about 100 ppm by weight or less, and/or the powdered niobium for a capacitor contains elements such as iron, nickel, cobalt, silicon, sodium, potassium and magnesium in a total amount of about 350 ppm by weight or less.

The detail reason obtained such result is not obvious, but it is considered that when the elements as impurities such as iron, nickel, cobalt, silicon, sodium, potassium and magnesium present more than some content in a powdered niobium, the impurities enter the dielectric layer when a capacitor is manufactured using the powdered niobium containing the elements and cause abnormal concentration of charges when a voltage is applied, as a result, the specific leakage current value of the capacitor is dispersed.

Furthermore when a given niobium compound crystal comprises the niobium sintered, the high temperature property of a capacitor is improved. The reason is described below.

Namely, the niobium-sintered body is inferior in the stability of the oxide dielectric film as compared with the tantalum-sintered body, and the higher the temperature is, the more serious the inferiority is. Many reasons may be considered for this but in one thinking, heat strain developed at a high temperature due to difference between the composition of the oxide dielectric film and the composition of the niobium sintered body seems to accelerate the deterioration of the oxide dielectric film. However, this heat strain considered to develop at a high temperature seems to mitigate when a niobium monoxide crystal and/or a diniobium mononitride crystal is contained in a niobium sintered body, as a result, a capacitor using the niobium sintered body is improved in the high temperature property.

The raw material of powdered niobium may be a commonly available material in the present invention.

For example, the powdered niobium which can be used may be obtained by reducing niobium halide with magnesium or sodium, reducing niobium fluoride with sodium, electrolyzing potassium niobium fluoride with a molten salt (NaCl+KCl) on a nickel cathode, or introducing hydrogen into a metal niobium ingot, and then pulverizing the product.

The powdered niobium obtained by such a method is considered to contain impurities from the raw material, reducing agent or instrument used. Representative examples thereof are the elements such as iron, nickel, cobalt, silicon, sodium, potassium and magnesium.

By adjusting the content of each element to about 100 ppm by weight or less, the powdered niobium of the present invention can be obtained. In order to more reduce the dispersion of the specific leakage current value, the content of each element is preferably adjusted to about 70 ppm by weight or less, more preferably about 30 ppm by weight or less.

Alternatively, by adjusting the total content of the elements to about 350 ppm by weight or less, the powdered niobium of the present invention can be obtained. In order to more reduce the dispersion of the specific leakage current value, the total content of the elements is preferably adjusted to about 300 ppm by weight or less, more preferably about 200 ppm by weight or less.

The content of each element can be adjusted to about 100 ppm by weight or less by repeatedly washing the powdered niobium obtained above using an acid containing at least one of hydrofluoric acid, nitric acid, sulfuric acid and hydrochloric acid and an alkali or using the acid, an alkali and an aqueous hydrogen peroxide, in sequence or in combination.

For example, the powdered niobium is thoroughly washed with sulfuric acid, then neutralized by an alkali to remove the sulfuric acid and repeatedly washed with water. In the case of using nitric acid, a combination use thereof with aqueous hydrogen peroxide is advantageous because the powder can be prevented from being oxidized by the nitric acid.

As the washing method, a method where the powder is stirred in the above-described reagent for a time period long enough to extract the impurities until each impurity content reaches a predetermined amount or less, may be used.

The present inventors have found that when the powdered niobium may be a powdered niobium partly bonded to at least one of nitrogen, carbon and boron, the leakage current property is improved more. Such compounds are niobium nitride, niobium carbide and niobium boride, which are a bonded product with nitrogen, carbon or boron. These compounds may be contained any of them or two or three thereof, or may be contained in combination.

The amount bonded, namely, the sum of nitrogen, carbon and boron contents, varies depending on the shape of powdered niobium, however, in the case of a powder having an average particle size of approximately from about 0.2 $\mu$m to about 30 $\mu$m, the amount bonded is from about 50 ppm to about 200,000 ppm, preferably from about 300 ppm to about 20,000 ppm. If the amount bonded is less than about 50 ppm, the leakage current property is deteriorated, whereas if it exceeds about 200,000 ppm, the capacity property is deteriorated and the capacitor manufactured cannot be used in practice.

The nitriding for forming niobium nitride may be any of liquid nitriding, ion nitriding, gas nitriding and the like, however, gas nitriding in a nitrogen gas atmosphere is preferred because this is simple and easy.

The gas nitriding in a nitrogen gas atmosphere is achieved by allowing the powdered niobium to stand in a nitrogen atmosphere. A powdered niobium having an objective nitrogen content can be obtained by allowing a powdered niobium to stand in a nitriding atmosphere at a temperature of about 2,000° C. or less for about tens of hours. In general, as the temperature is higher, the nitriding is achieved within a shorter time. When a powdered niobium is allowed to stand in a nitrogen atmosphere at room temperature for about tens of hours, a powdered niobium having a nitrogen content of about tens of ppm by weight can be obtained.

The carbonization for forming niobium carbide may be any of gas carbonization, solid phase carbonization and liquid carbonization. The carbonization may be achieved by allowing a powdered niobium to stand together with a carbon source, for example, a carbon material or an organic material containing carbon such as methane, at about 2,000° C. or less under reduced pressure for from about several minutes to about tens of hours.

The boriding for forming niobium boride may be any of gas boriding and solid phase boriding. The boriding may be achieved by allowing a powdered niobium to stand together with a boron source, for example, a boron pellet or a boron halide such as trifluoroboron, at about 2,000° C. or less under reduced pressure for from about several minutes to about tens of hours.

The niobium sintered body for a capacitor of the present invention is produced by sintering the above-described powdered niobium. One example of the production process for the sintered body is described below, however, the production process of the sintered body is by no means limited to this example.

For example, a powdered niobium is pressure formed into a predetermined shape and then heated at from about 500° C. to about 2,000° C. under from about 1 to about $10^{-6}$ Torr for from about several minutes to about several hours.

For improving the high temperature property, the sintered body may contain niobium monoxide crystal and/or diniobium mononitride crystal.

The sintered body comprised niobium monoxide crystal and/or diniobium mononitride crystal is previously mixed with fine powder (average particle size: approximately from about 0.1 to about 100 μm) of the above-described crystal(s) with powdered niobium, before sintering.

In the case where the powdered niobium used in the present invention is a partially nitrided powdered niobium, a part or the whole of the nitrided powered niobium may be crystallized by controlling the conditions at the sintering of the powder compact, such as temperature rising rate, maximum temperature, residence time at the maximum temperature and temperature falling rate, to obtain diniobium mononitride crystal.

The powdered niobium for use in the present invention is one of valve metals the same as aluminum and tantalum, therefore, the surface thereof is covered with an oxide in air. The oxygen amount varies depending on the average particle size of powdered niobium. In the case of powdered niobium having an average particle size of from about 3 to about 30 μm, the oxygen amount is usually from about 500 to about 30,000 ppm by weight. In this powdered niobium having thereon an oxide, a part or the whole of the oxide may be crystallized, similarly to the case of compacting and then sintering partially nitrided powdered niobium, by controlling the conditions at the sintering, such as temperature rising rate, maximum temperature, residence time at the maximum temperature and temperature falling rate, to obtain niobium monoxide crystal.

In the case of using the crystallization technique by the control of sintering conditions, when the relationship between the above-described sintering conditions and the amount of each crystal obtained from the nitride and/or oxide is detected in a preliminary experiment, a sintered body containing a predetermined amount of niobium monoxide and/or diniobium mononitride crystal may be obtained with a reduced or zero amount of niobium monoxide crystal and/or diniobium mononitride crystal previously mixed with powdered niobium.

The content of niobium monoxide is preferably from about 0.1 wt % to about 20 wt %, more preferably from about 0.1 wt % to about 10 wt %. The content of diniobium mononitride is preferably from about 0.1 wt % to about 20 wt %, more preferably from about 0.1 wt % to about 10 wt %. If each content exceeds about 20 wt %, the initial capacity value $C_0$ rather decreases and this is not preferred.

A capacitor can be produced with two electrodes and a dielectric material interposed between two electrodes, one part electrode (first electrode) being the sintered body as described above.

Examples of the dielectric material which can be used for the capacitor include tantalum oxide, niobium oxide, polymer materials and ceramic compounds. In the case of using tantalum oxide as the dielectric material, the tantalum oxide may be formed also by attaching a complex containing tantalum, such as alkoxy complex or acetylacetonato complex, to the electrode and then hydrolyzing and/or thermally decomposing the complex.

In the case of using niobium oxide as the dielectric material, the niobium oxide may be formed also by chemically forming the niobium sintered body as one part electrode in an electrolytic solution or by attaching a complex containing niobium, such as alkoxy complex or acetylacetonato complex, to the electrode and then hydrolyzing and/or thermally decomposing the complex. In this way, by chemically forming the niobium sintered body in an electrolytic solution or hydrolyzing and/or thermally decomposing a niobium-containing complex on the niobium electrode, a niobium oxide dielectric may be formed on the niobium electrode. The chemical formation of niobium electrode in an electrolytic solution is usually performed using an aqueous protonic acid solution, for example, an about 0.1% aqueous phosphoric acid or sulfuric acid solution.

In the case where a niobium oxide dielectric is formed by chemically forming the niobium electrode in an electrolytic solution, the capacitor of the present invention is an electrolytic capacitor and the niobium electrode side acts as an anode. In the case where the dielectric is formed by decomposing a complex, the electrode has theoretically no polarity and may be used either as an anode or a cathode.

In the case of using a polymer material as the dielectric material, as described, for example, in JP-A-7-63045 (the term "JP-A" as used herein means an "unexamined published Japanese patent application"), a method of introducing a monomer in the gas or liquid state into pores or voids of a metal and polymerizing it, a method of introducing a polymer material after dissolving it in an appropriate solvent, or a method of melting and then introducing a polymer material may be used. Examples of the polymer material include fluororesin, alkyd resin, acrylic resin, polyester resin such as polyethylene terephthalate, vinyl-type resin, xylylene resin and phenol resin.

For forming a ceramic compound into a dielectric material, as described, for example, in JP-A-7-85461, a method of producing a perovskite compound on the surface of a metal having pores or voids may be used. Specific examples of the perovskite compound include $BaTiO_3$, $SrTiO_3$ and $BaSnO_3$.

The other part electrode of the capacitor of the present invention is not particularly limited and, for example, at least one compound selected from an electrolytic solution, an organic semiconductor and an inorganic semiconductor, which are all known in the art of aluminum electrolytic capacitor, may be used.

Specific examples of the electrolytic solution include a mixed solution of dimethylformamide and ethylene glycol having dissolved therein about 5 wt % of an isobutyltripropylammonium borotetrafluoride electrolyte, and a mixed solution of propylene carbonate and ethylene glycol having dissolved therein about 7 wt % of tetraethylammonium borotetrafluoride.

Specific examples of the organic semiconductor include an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising 2 and more of repeating unit represented by formula (1) or (2) shown below.

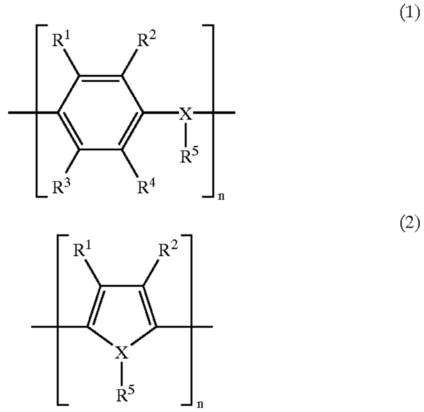

In formulae (1) and (2), $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$ or $R^3$ and $R^4$ may be combined with each other to form a ring.

Specific examples of the inorganic semiconductor include an inorganic semiconductor mainly comprising lead dioxide and manganese dioxide, and an inorganic semiconductor comprising triiron tetroxide. These semiconductors may be used either individually or in combination of two or more thereof.

Examples of the polymer comprising the repeating unit represented by formula (1) or (2) include polyaniline, polyoxyphenylene, polyphenylenesulfide, polythiophene, polyfurane, polypyrrole, polymethylpyrrole and derivatives of these polymers.

Out of these organic or inorganic semiconductors, when a semiconductor having conductivity of from about $10^{-2}$ to about $10^3$ $S \cdot cm^{-1}$ is used, the capacitor manufactured can be more reduced in the impedance and can be more increased in the capacity at a high frequency.

In the case when the other part electrode (second electrode) is a solid, a conducting layer may be formed on the electrode to improve the electric contact with external leading terminal (ie. Lead-frame). The conducting layer can be formed, for example, by solidifying conducting paste, plating, deposition of metal, forming conducting polymer film having heat-resisting etc. As a conducting paste, silver paste, copper paste, aluminium paste, carbon paste or nickel paste is preferable. These may be used either individually or in combination of two or more thereof. In a case of using two and more, it may be mixed or sequentially laminated independently. The conducting paste after applied is stood in air or solidified by heating. As a plating method, nickel-plating, copper-plating, silver-plating, aluminium-plating are applied. The metals for the deposition are aluminium, nickel, copper and silver etc.

A capacitor is fabricated, for example, by sequentially laminating aluminium paste and silver paste on the other part electrode (second electrode) and sealing the laminate with a material such as epoxy resin. This capacitor may have a niobium or tantalum lead, which is sintering formed integrally with the niobium sintered body or afterward welded.

The capacitor of the present invention, as described above, can be produced to the various capacitors by fabricated with resin molding, resin-case, outer case of metal, resin dipping or packing by laminate-film.

In the case where the other part electrode (second electrode) is a liquid, a capacitor fabricated as above from two electrodes and a dielectric material is housed, for example, in a can electrically connected to the other part electrode to accomplish the capacitor. In this case, the niobium sintered body electrode side is guided outside through the niobium or tantalum lead and at the same time, designed to be insulated from the can using an insulating rubber or the like.

By manufacturing a capacitor as described in the foregoing, a large capacity per unit weight and a small dispersion in the specific leakage current value can be attained and the probability of the specific leakage current value exceeding 10 [nA/$\mu$F·V] can be reduced, as a result, the capacitor obtained can have good specific leakage current property and high reliability.

BEST MODE FOR CARRYING OUT THE INVENTION

Specific examples of the present invention are described in greater detail below. But the present invention is not limited by the examples.

The weight of each element M contained in the powdered niobium was determined by an atomic absorption analysis.

The amount of niobium monoxide crystal and/or diniobium mononitride crystal in the niobium sintered body was calculated using the weight of each crystal contained in the mixed powder before sintering and the ratio in the 2θ diffraction intensity measured by X-ray diffraction between the mixed powder before sintering and the pulverized powder of the sintered body.

The "specific leakage current value" as used herein is defined as a value obtained by dividing the leakage current value 1 minute after the application of a rated voltage at room temperature by the product of capacity and rated voltage. The capacity is a value measured at room temperature and 120 kHz, and the rated voltage is 6.3 [V].

The high-temperature property of the capacitor produced was defined as the ratio $(C-C_0)/C_0$ to the capacity C when the capacitor was left standing for 2,000 hours in an atmosphere of 105° C. at an applied voltage of 4 V and then returned to the room temperature. When this ratio falls within ±20%, the product was rated non-defective. The evaluation was made by the ratio between the number of samples and the number of non-defective units. In each test example, the number of samples was 50.

EXAMPLES

Test Examples 1 to 6

Niobium pentachloride and magnesium were thoroughly vacuum dried at 80° C. and charged into a nickel crucible to allow the reduction reaction to proceed at 800° C. for 40 hours in an argon atmosphere. The reduced product was cooled, washed with water to remove magnesium chloride, washed with sulfuric acid, again washed with water and then vacuum dried. 120 g of the dried product was placed in an alumina pot containing silica alumina balls and pulverized by ball milling to obtain powdered niobium (average particle size: 5 μm). 20 g of the powdered niobium at this stage was designated as Test Example 1. 100 g of the powdered niobium remaining was immersed in a 1:1 mixed solution of hydrofluoric acid and nitric acid and stirred. During the stirring, 20 g of the solution was sampled every 1 hour and the solution samples were thoroughly washed with water until the washing water reached a pH of 7 and then vacuum dried to obtain powdered niobium samples of Test Examples 2 to 6 each in an amount of 20 g.

From the powdered niobium of each Test Example, 50 compacts each in a size of 3×4×1.8 mm were manufactured. Subsequently, the compacts were left standing in vacuum of $5\times10^{-5}$ Torr at a maximum temperature of 1,200° C. for 30 minutes to obtain sintered bodies. These sintered bodies each was electrolytically formed (20V) in a 0.1% aqueous phosphoric acid solution to form a dielectric oxide film on the surface thereof. Thereafter, each sintered body was immersed in an aqueous manganese nitrate solution and then heated at 220° C. By repeating this operation of immersing and then heating, a manganese dioxide layer as the other part electrode layer was formed on the dielectric oxide film. Then, a carbon layer and a silver paste layer were sequentially laminated thereon, a lead frame was placed thereon, and the entire body was sealed with epoxy resin. In this way, 50 units of chip-type capacitors were manufactured. The evaluation results are shown in Table 2.

Test Examples 7 to 9

Capacitors were produced in the same manner as in Test Example 6 except for forming the other part electrode by the method shown in Table 1. The evaluation results are shown in Table 2.

TABLE 1

| | Other Part Electrode | Method for Forming Electrode |
|---|---|---|
| Test Example 7 | Mixture of lead dioxide and lead sulfate (lead dioxide: 94 wt %) | Oxidation reaction in a lead acetate solution was repeated. |
| Test Example 8 | Chloranile complex of tetrathiotetracene | Immersing in a solution of compound for other part electrode and then drying were repeated |
| Test Example 9 | Polypyrrole doped with aromatic sulfonic acid | Oxidation reaction in a pyrrole solution was repeated. |

Test Examples 10 to 15

Potassium niobium fluoride and sodium were thoroughly vacuum dried at 80° C. and charged into a nickel crucible to allow the reduction reaction to proceed at 1,000° C. for 20 hours in an argon atmosphere. The reduced product was cooled, washed with water to remove potassium fluoride and sodium fluoride, washed with sulfuric acid, again washed with water and then vacuum dried. 120 g of the dried product was placed in an alumina pot containing silica alumina balls and pulverized by ball milling to obtain powdered niobium (average particle size: 4 μm). 20 g of the powdered niobium at this stage was designated as Test Example 10. 100 g of the powdered niobium remaining was immersed in a 3:2 mixed solution of nitric acid and aqueous hydrogen peroxide and stirred. During the stirring, 20 g of the solution was sampled every 1 hour and the solution samples were thoroughly washed with water until the washing water reached a pH of 7 and then vacuum dried to obtain powdered niobium samples of Test Examples 11 to 15 each in an amount of 20 g. From the powdered niobium of each Test Example, 50 capacitors were manufactured in the same manner as in Test Example 1. The evaluation results are shown in Table 2.

Test Examples 16 to 18

20 g of powdered niobium obtained in the same manner as in Test Example 10 was placed in an alumina ceramic-made boat, and the boat was charged into an SUS304 tube and left standing at 400° C. for 3 hours in a nitrogen atmosphere to obtain partially nitrided powdered niobium having a nitrogen content of about 2,500 ppm by weight. This was designated as the powdered niobium of Test Example 16. 20 g of the powdered niobium obtained in the same manner as in Test Example 10 was placed in a carbon crucible, left standing at 1,500° C. for 30 minutes under reduced pressure (about $5\times10^{-5}$ Torr) in a molybdenum furnace, cooled at room temperature and then pulverized using a vortex mill. This was designated as the powdered niobium of Test Example 17. 20 g of the powdered niobium obtained in the same manner as in Test Example 17 was further nitrided in the same manner as in Test Example 16 to obtain partially carbonized and partially nitrided powdered niobium having a carbon content of about 1,000 ppm by weight and a nitrogen content of about 2,000 ppm by weight. This was designated as Test Example 18. Each of the thus-obtained powdered niobium samples of Test Examples 16 to 18 was washed and used to manufacture capacitors in the same manner as in Test Example 15. The evaluation results are shown in Table 2.

Test Examples 19

Except using a carbon crucible placed 20 g of powdered niobium therein and standing at 1500° C. in Test Example 17, a platinum crucible was used to put 1 g of boron pellet and the standing operation at 1000° C. were carried out as same as in Test Example 17. Subsequently a partially borated powdered niobium (boron element: about 850 ppm by weight) was obtained Test Examples 20 to 24

A 60-mmφ niobium ingot was charged into an SUS304-made reactor and after once evacuating the system by vacuumizing (about $6\times10^{-4}$ Torr), the temperature was elevated to 800° C. Subsequently, hydrogen was introduced, the temperature was raised to 350° C. and further hydrogen was continuously introduced for 50 hours. The hydrogenated niobium lump was cooled and then pulverized in an SUS304 made pot containing iron-made balls. The resulting pulverized product was placed in the SUS304-made reactor used above and again hydrogenated under the above-described conditions. The resulting hydride was placed together with water and zirconia balls in an iron-made wet pulverizer (trade name "Attritor") and wet pulverized. Thereafter, the powder was washed with sulfuric acid and then with water, and vacuum dried to obtain about 100 g of powdered niobium (average particle size: 3 μm). The powdered niobium at this stage was designated as Test Example 19. A powdered niobium treated in the same manner as in Test Example 19 was stirred in a 1:1 mixed solution of hydrofluoric acid and nitric acid. During the stirring, 20 g of the solution was sampled every 1 hour and the solution samples were thoroughly washed with water until the washing water reached a pH of 7 and then vacuum dried to obtain powdered niobium samples of Test Examples 20 to 23 each in an amount of 20 g. From the powdered niobium of each Test Example, 50 capacitors were manufactured in the same manner as in Test Example 1. The evaluation results are shown in Table 2.

TABLE 2

| Test | Content of Elements M [wtppm] | | | | | | | | Specific Leakage Current, non-defective/number |
|---|---|---|---|---|---|---|---|---|---|
| Example | Fe | Ni | Co | Si | Na | K | Mg | Total | of test samples |
| 1 | 100 | 100 | 40 | 180 | 15 | 15 | 200 | 650 | 45/50 |
| 2 | 80 | 80 | 40 | 110 | 10 | 10 | 80 | 410 | 47/50 |
| 3 | 60 | 60 | 30 | 110 | 10 | 10 | 60 | 340 | 49/50 |
| 4 | 50 | 60 | 30 | 90 | 10 | 10 | 60 | 310 | 50/50 |
| 5 | 50 | 60 | 30 | 70 | 10 | 10 | 60 | 290 | 50/50 |
| 6 | 50 | 50 | 30 | 60 | 10 | 10 | 50 | 260 | 50/50 |
| 7 | 50 | 50 | 30 | 60 | 10 | 10 | 50 | 260 | 50/50 |
| 8 | 50 | 50 | 30 | 60 | 10 | 10 | 50 | 260 | 50/50 |
| 9 | 50 | 50 | 30 | 60 | 10 | 10 | 50 | 260 | 50/50 |
| 10 | 110 | 110 | 50 | 200 | 110 | 180 | 20 | 780 | 46/50 |
| 11 | 90 | 90 | 30 | 120 | 80 | 130 | 20 | 560 | 47/50 |
| 12 | 90 | 70 | 20 | 90 | 20 | 60 | 20 | 370 | 49/50 |
| 13 | 70 | 70 | 20 | 80 | 20 | 60 | 20 | 340 | 50/50 |
| 14 | 70 | 70 | 20 | 70 | 20 | 50 | 20 | 320 | 50/50 |
| 15 | 50 | 50 | 20 | 60 | 20 | 50 | 20 | 270 | 50/50 |
| 16 | 50 | 50 | 20 | 60 | 20 | 50 | 20 | 270 | 50/50 |
| 17 | 50 | 50 | 20 | 60 | 20 | 50 | 20 | 270 | 50/50 |
| 18 | 50 | 50 | 20 | 60 | 20 | 50 | 20 | 270 | 50/50 |
| 19 | 50 | 50 | 20 | 60 | 20 | 50 | 20 | 270 | 50/50 |
| 20 | 190 | 190 | 110 | 80 | 5 | 5 | 10 | 590 | 45/50 |
| 21 | 110 | 100 | 60 | 80 | 5 | 5 | 10 | 370 | 47/50 |
| 22 | 30 | 30 | 20 | 60 | 5 | 5 | 10 | 160 | 50/50 |
| 23 | 20 | 20 | 20 | 40 | 5 | 5 | 10 | 120 | 50/50 |
| 24 | 20 | 20 | 20 | 30 | 5 | 5 | 5 | 105 | 50/50 |

From comparison in Table 2 of Test Examples 1, 2 and 3 with Test Examples 4 to 9, Test Examples 10, and 11 with Test Examples 12 to 18, and Test Examples 20 and 21 with Test Examples 22 to 24, it is seen that when the content of each element is 100 ppm by weight or less, the probability of defective occurring with respect to the specific leakage current value can be reduced.

From comparison in Table 2 of Test Examples 1 and 2 with Test Examples 3 to 9, Test Examples 10, 11 and 12 with Test Examples 11 to 18, and Test Examples 20 and 21 with Test Examples 22 to 24, it is seen that when the total content of elements is 350 ppm by weight or less, the probability of defectives occurring with respect to the specific leakage current value can be reduced.

Test Examples 25 to 28

To powdered niobium (of which surface was covered with about 1.5 wt % of natural oxide) having a particle size of 4 μm, 2 wt % of niobium monoxide crystal (average particle size: 2 μm) was mixed. 0.1 g of the resulting mixed powder was sampled and compacted simultaneously with a niobium lead to obtain a compact having a size of 3×4×1.8 mm. Subsequently, the compact was left standing in vacuum of $5\times10^{-5}$ Torr for 30 minutes while raising the temperature at a rate of 10° C./min to a maximum temperature of 1,100° C. and then the temperature was dropped at an average dropping rate of about 80° C./min while charging thereinto Ar gas to obtain a sintered body. In this way, 200 units of niobium sintered bodies were prepared and all were subjected to electrolytic formation (20 V) in a 0.1% aqueous phosphoric acid solution to form an oxide dielectric film on the surface. Then, the sintered bodies were divided into 4 groups each consisting of 50 units. On the oxide dielectric film, the other party electrode layer shown in Table 1 was formed, carbon paste and silver paste were sequentially laminated thereon, a lead frame was connected and the whole was sealed with epoxy resin to prepare chip-type capacitors. In the sintered body, the amount of niobium monoxide crystal was 2.6 wt %. The evaluation results are shown in Table 4.

TABLE 3

| | Other party electrode | Method for Forming Electrode |
|---|---|---|
| Test Example 25 | Mixture of lead dioxide and lead sulfate (lead dioxide: 94 wt %) | Oxidation reaction in a lead acetate solution was repeated. |
| Test Example 26 | Chloranile complex of tetrathiotetracene | Immersing in a solution of compound for other party electrode and then drying were repeated. |
| Test Example 27 | Polypyrrole doped with aromatic sulfonic acid | Oxidation reaction in a pyrrole solution was repeated. |
| Test Example 28 | Manganese dioxide | Thermal decomposition of manganese nitrate was repeated. |

Test Example 29

Powdered niobium the same as in Test Example 25 was left standing in a nitrogen atmosphere at 400° C. for 3 hours to obtain partially nitrided powdered niobium having a nitrogen content of about 2,500 ppm by weight. To this powder, 0.5 wt % of diniobium mononitride crystal (average crystal size: 0.8 μm) was mixed. Using the mixture obtained, a capacitor was produced in the same manner as in Test Example 25. In the sintered body, the amounts of niobium monoxide crystal and diniobium mononitride crystal were 0.5 wt % and 0.7 wt %, respectively. The evaluation results are shown in Table 4.

Test Example 30

Powdered niobium (of which surface was covered with about 0.8 wt % of natural oxide) having an average particle size of 5.5 μm was left standing in a nitrogen atmosphere at 800° C. for 3 hours to obtain partially nitrided powdered niobium having a nitrogen content of about 15,000 ppm by weight. To this powder, 5 wt % of diniobium mononitride crystal (average crystal size: 0.2 μm) was mixed. Using the mixture obtained, a capacitor was produced in the same manner as in Test Example 25. In the sintered body, the amount of diniobium mononitride crystal were 6.3 wt %. The evaluation results are shown in Table 4.

Test Example 31

Powdered niobium the same as in Test Example 25 was placed in a carbon crucible, left standing at 1,500° C. for 30 minutes under reduced pressure, returned to room temperature, taken out from the crucible and pulverized in a vortex mill to obtain partially carbonized powdered niobium having a carbon content of about 1,000 ppm by weight. To this powder, 7 wt % of niobium monoxide crystal used in Test Example 1 was mixed. The resulting mixture was compacted in the same manner as in Test Example 25. The compact obtained was left standing for 1 hour in vacuum of $6\times10^{-5}$ Torr while raising the temperature at a rate of 4° C./min to a maximum temperature of 1,200° C. and then returned to room temperature over 10 hours without displacing the gas to obtain a niobium sintered body. Using the niobium-sintered body obtained, a capacitor was produced in the same manner as in Test Example 25. In the sintered body, the amount of niobium monoxide crystal was 8.3 wt %. The evaluation results are shown in Table 4.

Test Example 32

Partially carbonized powdered niobium of Test Example 31 was nitrided in the same manner as in Test Example 29 to obtain partially carbonized and partially nitrided powdered niobium having a carbon content of about 1,000 ppm by weight and a nitrogen content of about 2,500 ppm by weight. To this powder, 0.1 wt % of powdered diniobium mononitride was mixed. Using the mixture obtained, a capacitor was produced in the same manner as in Test Example 31. In the sintered body, the amounts of niobium monoxide crystal and diniobium mononitride crystal were 1.3 wt % and 0.35 wt %, respectively. The evaluation results are shown in Table 4.

Test Example 33

A capacitor was produced in the same manner as in Test Example 25 except that the amount of niobium monoxide crystal mixed was changed to 20 wt %. In the sintered body, the content of niobium monoxide crystal was 20.5 wt %. The evaluation results are shown in Table 4.

Test Example 34

A capacitor was produced in the same manner as in Test Example 30 except that the amount of diniobium mononitride crystal mixed was changed to 20 wt %. In the sintered body, the content of niobium monoxide crystal was 21.3 wt %. The evaluation results are shown in Table 4.

Test Example 35

A capacitor was produced in the same manner as in Test Example 30 except that powdered niobium used was not partially nitrided and diniobium mononitride crystal was not mixed. The evaluation results are shown in Table 4.

TABLE 4

| | Initial Capacity, $C_o$ [μF] | Evaluation of High-Temperature Property (non-defective units)/(number of samples) | Particle Size [μm] | Content of Niobium Monoxide Crystal [wt %] | Content of Diniobium Monoitride Crystal [wt %] |
|---|---|---|---|---|---|
| Test Example 25 | 230 | 50/50 | 4 | 2.6 | <0.1 |
| Test Example 26 | 200 | 50/50 | 4 | 2.6 | <0.1 |
| Test Example 27 | 200 | 50/50 | 4 | 2.6 | <0.1 |
| Test Example 28 | 220 | 50/50 | 4 | 2.6 | <0.1 |
| Test Example 29 | 230 | 50/50 | 4 | 0.5 | 0.7 |
| Test Example 30 | 160 | 50/50 | 5.5 | <0.1 | 6.3 |
| Test Example 31 | 225 | 50/50 | 4 | 8.3 | <0.1 |
| Test Example 32 | 225 | 50/50 | 4 | 1.3 | 0.35 |
| Test Example 33 | 190 | 50/50 | 4 | 20.5 | <0.1 |
| Test Example 34 | 120 | 50/50 | 5.5 | <0.1 | 21.3 |
| Test Example 35 | 160 | 45/50 | 5.5 | <0.1 | <0.1 |

From comparison between Test Examples 25 to 34 and Test Example 35 in Table 4, it is seen that when 0.1 wt % or more of niobium monoxide or diniobium mononitride crystal is present in the sintered body, the high-temperature property is more improved. Furthermore, from the comparison between Test Example 25 and Test Example 33 or between Test Example 30 and Test Example 34, it is seen that when the amount of the crystal exceeds 20 wt %, the initial capacity is reduced.

INDUSTRIAL APPLICABILITY

By using the niobium sintered body of the present invention for a capacitor, a capacitor having a large capacity per the unit weight and a good leakage current value can be produced.

By using the niobium-sintered body, comprising niobium monoxide crystal and/or a diniobium mononitride crystal in a capacitor, the high-temperature property can be improved.

What is claimed is:

1. A powder niobium for a capacitor, comprising at least one element selected from the group consisting of iron, nickel, cobalt, silicon, sodium, potassium and magnesium, wherein an amount of each element is about 100 ppm by weight or less.

2. A powder niobium for a capacitor, comprising at least one element selected from the group consisting of iron, nickel, cobalt, silicon, sodium, potassium and magnesium, wherein the total amount of the elements is about 350 ppm by weight or less.

3. A powdered niobium for a capacitor, comprising at least one element selected from the group consisting of iron, nickel, cobalt, silicon, sodium, potassium and magnesium, wherein an amount of each element is about 100 ppm by weight or less and the total amount of the elements is about 350 ppm by weight or less.

4. The powdered niobium for a capacitor claimed in any one of claims 1 to 3, further comprising at least one of niobium nitride, niobium carbide or niobium boride.

* * * * *